US006247833B1

(12) United States Patent
Neustadt

(10) Patent No.: US 6,247,833 B1
(45) Date of Patent: Jun. 19, 2001

(54) LAMP FOR REFRACTING LIGHT AND JUNCTION BOX

(76) Inventor: Jerome Neustadt, 5 Holly Ave., Florida, NY (US) 10921

(*) Notice: Subject to any disclaimer, the term of this patent is extended or adjusted under 35 U.S.C. 154(b) by 0 days.

(21) Appl. No.: 09/358,953

(22) Filed: Jul. 22, 1999

Related U.S. Application Data

(60) Provisional application No. 60/094,134, filed on Jul. 24, 1998.

(51) Int. Cl.[7] ..... B60Q 1/00
(52) U.S. Cl. ..... 362/370; 362/332
(58) Field of Search ..... 362/332, 363, 362/370

(56) References Cited

U.S. PATENT DOCUMENTS 4,320,443 * 3/1982 Zwillich ..... 362/370
4,368,506 * 1/1983 Rapp ..... 362/147
4,384,316 * 5/1983 De Vos et al. ..... 362/147
4,449,168 * 5/1984 Ewing ..... 362/370
4,462,068 * 7/1984 Shadwick ..... 362/332
4,858,091 * 8/1989 Fouke ..... 362/332
5,416,683 * 5/1995 McCarthy ..... 362/332
5,803,590 * 9/1998 Wedell et al. ..... 362/370

* cited by examiner

*Primary Examiner*—Sandra O'Shea
(74) *Attorney, Agent, or Firm*—D. Peter Hochberg; Katherine R. Vieyra; William H. Holt

(57) ABSTRACT

A lamp fixture having a top housing with slightly slanted side walls, a faceted rectangular glass portion extending from the housing and held affixed to the housing by a door, and a junction box and an extrusion plate for mounting the fixture to an electrical or junction box in a building. The extrusion plate is mounted to a sidewall of the housing. The extrusion plate includes J or hooked shaped end portions forming cavities therein. The junction box includes ridges. The ridges are slightly angled to match the angle of the sidewalls of the fixture housing. The fixture and mounted extrusion plate can then be lifted above the junction box, and the cavities of the extrusion plate slid over the ridges of the junction box. The top surface of the extrusion plate is slightly angled to compensate for the angle of the ridges, so that the top surfaces of the extrusion plate and the junction box are flush with one another. The wire connections are made and pushed into the junction box. A top plate is placed and secured to the top surfaces of the junction box and the extrusion plate.

11 Claims, 5 Drawing Sheets

LAMP FOR REFRACTING LIGHT AND JUNCTION BOX

CROSS REFERENCE TO RELATED APPLICATIONS

This application claims the benefit of U.S. Provisional Patent Application, Serial No. 60/094,134 filed Jul. 24, 1998, under Title 35 United States Code §119(e).

BACKGROUND OF THE INVENTION

1. Field of the Invention

The present invention relates generally to lamps and more particularly to a lamp for refracting light in different directions. The invention more specifically relates to a lamp that includes a junction box for connecting the wiring of the lamp to an electrical junction box in a building.

2. Description of Prior Art

Present lamp fixtures are designed to spread light outwardly over a given area. Existing lamp fixtures do not give off sufficient light when the lamp fixtures are against the wall of a building. The current invention solves this problem by providing several faceted, light transmitting portions on a lamp to spread the light in any one of a forward, left, right and downward direction.

Additionally, current lamp fixtures require electricians to open up the light fixtures, so that the electrical wiring can be completed. The wiring may have to run through a hundred feet of conduit to the electrical or junction box, or a separate junction box will have to be installed near the lamp fixture. Separate brackets must be provided to mount the lamp fixture to the wall. The current invention solves this problem by providing a junction box that can be mounted to an electrical box or junction box in a building, and also act as a support for the lamp fixture. All electrical connections are made and pushed into the junction box, eliminating the need for additional junction boxes.

SUMMARY OF THE INVENTION

In accordance with a preferred embodiment of the present invention, the inventive apparatus is a lamp fixture having a top housing with slightly slanted side walls, a faceted rectangular glass portion extending from the housing and held affixed to the housing by a door, and a junction box and an extrusion plate for mounting the fixture to an electrical or junction box in a building. The extrusion plate is mounted to a sidewall of the housing. The extrusion plate includes J or hooked shaped end portions forming cavities therein. The junction box has a rear wall that is mounted to an electrical or junction box in a building. Sidewalls extend generally perpendicularly from the rear wall to ridges that extend generally perpendicularly and outwardly from the sidewalls. The ridges are slightly angled to match the angle of the sidewalls of the fixture housing. The fixture and mounted extrusion plate can then be lifted above the junction box, and the cavities of the extrusion plate can be slid over the ridges of the junction box. The top surface of the extrusion plate is slightly angled to compensate for the angle of the ridges, so that the top surfaces of the extrusion plate and the junction box are flush with one another. The wire connections are made and pushed into the junction box. A top plate is placed and secured to the top surfaces of the junction box and the extrusion plate.

An object of this invention is to provide a lamp fixture that does not require an electrician to open the fixture to wire it to a wall.

Another object of this invention is to provide a lamp fixture junction box that can be attached to an electrical or junction box in a building.

An additional object of this invention is to provide a lamp fixture that spreads light in different directions—forward and downward, and left and right Another object of this invention is to provide a lamp fixture with less closure plugs than those which are presently known.

Another object of this invention is to provide junction box that also acts as a wiring box.

Another object of this invention is to provide a junction box that allows for expansion of wiring to other lamp fixtures.

A further object of this invention is to provide a lamp fixture and junction box assembly that is cost effective, easy to assemble in the factory and easy to install in the field.

These and other objects will become apparent from the following description of a preferred embodiment, taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
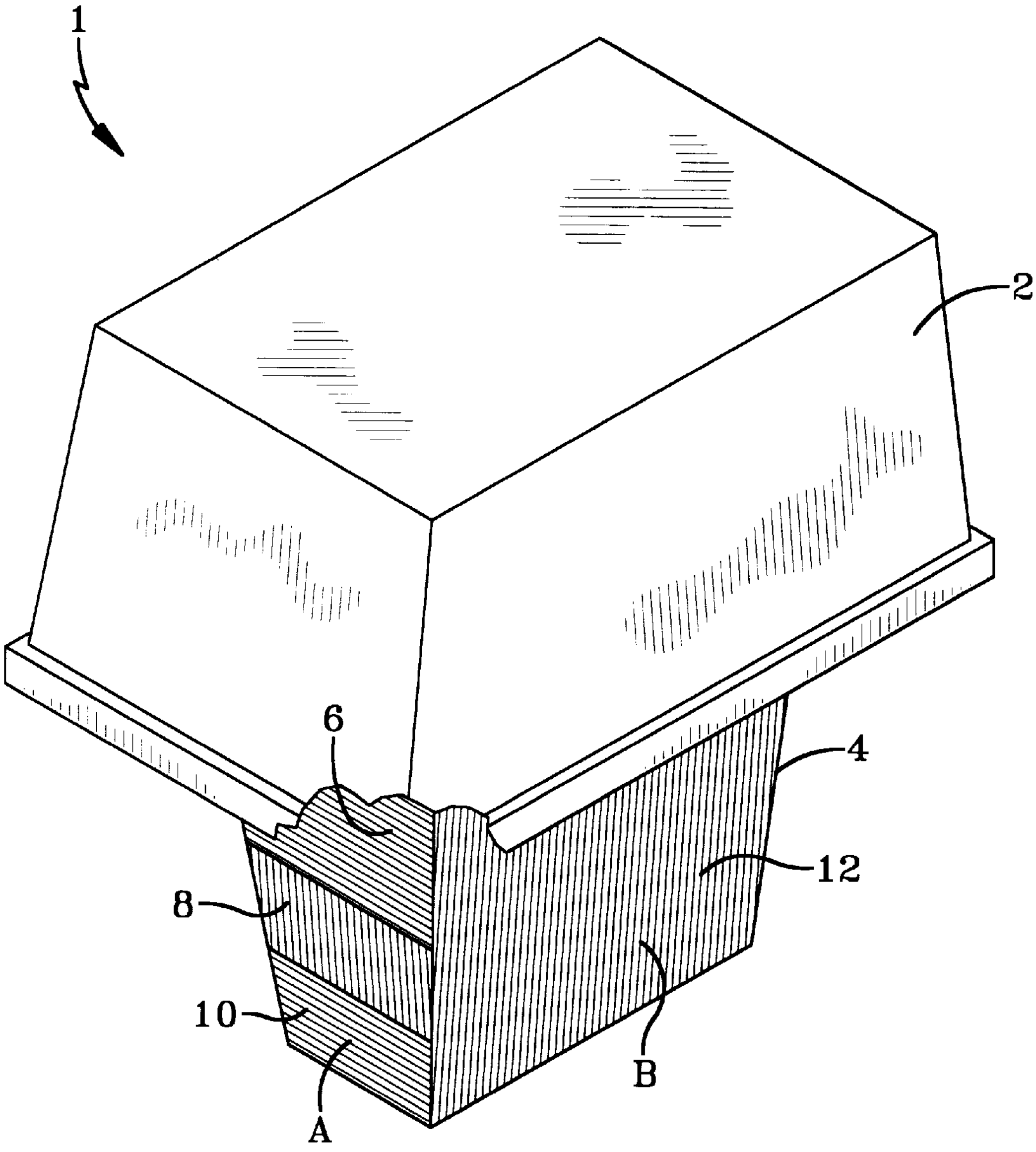
FIG. 1 is a front perspective view of a preferred embodiment of the invention.

Referring now to the drawings wherein the showings are for the purpose of illustrating the preferred embodiment of the invention only, and not for the purpose of limiting the same, FIG. 1 shows a lamp fixture 1 having a fixture or top housing 2 and a rectangular refracted glass portion 4 extending downwardly from fixture housing 2. Housing 2 has slighted slanted walls for allowing runoff of water and a flat vented top for releasing heat from a lamp inside the lamp fixture. Glass portion 4 has a first side A including sections having facets 6, 8, and 10, and a second side B having facets 12.

In a preferred embodiment, facets 6, 8, and 10 refract light left and right, and side B is faceted to face the wall of a building with facets 12 bathing the wall with light (when the lamp is ignited) from left to right. The side opposite to side B (not shown) is faceted to shine light out and down, while the bottom of the glass is faceted to emit light to the ground from left to right.

Figure 3:
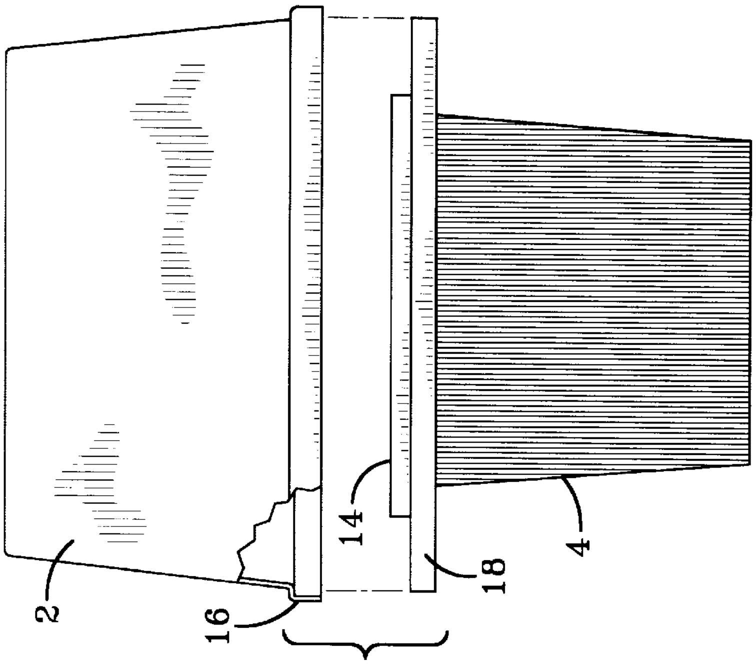
FIG. 3 is a front view of the preferred embodiment of the invention shown in FIG. 1.
Figure 2:
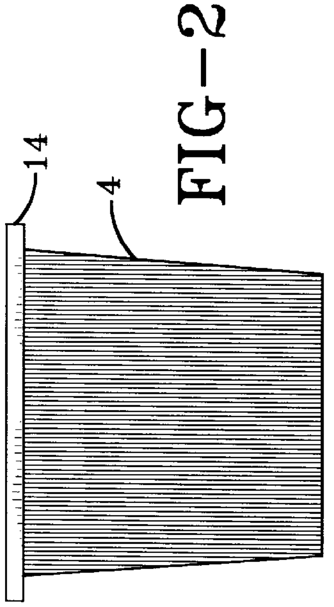
FIG. 2 is a front view of a rectangular faceted glass portion of the preferred embodiment of the invention.
Figure 4:
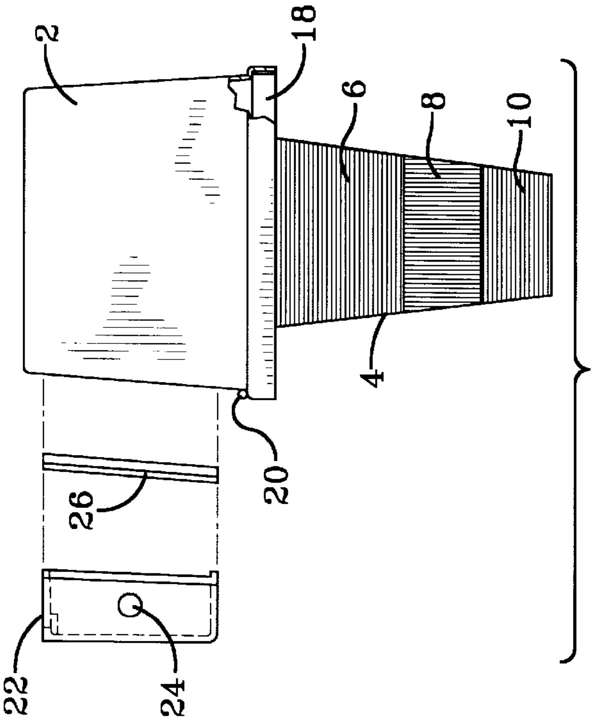
FIG. 4 is a side view of the preferred embodiment of the invention shown in FIGS. 1 and 3, including a preferred junction box and a preferred extrusion plate.

Referring to FIGS. 2–4, glass portion 4 includes an outer peripheral flange 14. Glass portion 4 is slid into a door 18 having an opening that is dimensioned to receive glass portion 4 and stop outer peripheral flange 14. Door 18 holding glass portion 4 is attached to fixture housing 2 by an internal hinge 20. Many other conventional methods could be used to attach door 18 to housing 2. Housing 2 could include a drip cap as part of the bottom perimeter of housing 2. This helps prevent moisture from getting into housing 2 through door 18. A junction box 22 is designed so that its back is mounted to the building junction box electrically connected to an electrical box in a building, and to an extrusion or mounting plate 26 on the front of junction box 22. Junction box 22 includes closure plugs 24 on opposite sides for running wiring to additional fixtures. Extrusion plate 26 is mounted to fixture housing 2. A gasket (not shown) is placed between extrusion plate 26 and fixture housing 2. The details and interrelationship of junction box 22 and extrusion plate 26 are described below.

Figure 6:
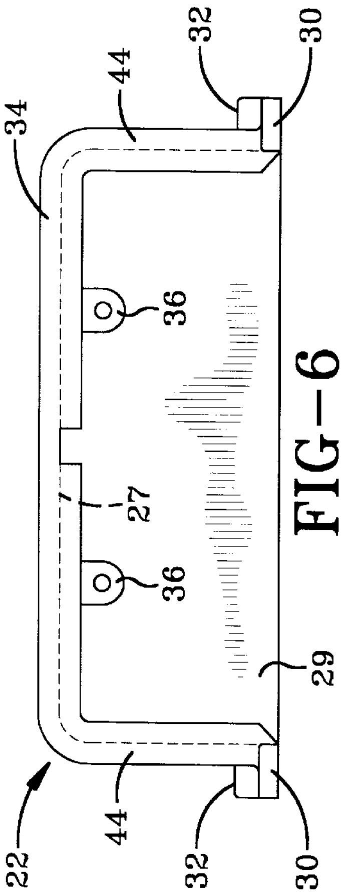
FIG. 6 is a top view of the preferred junction box of FIG. 4.
Figure 7:
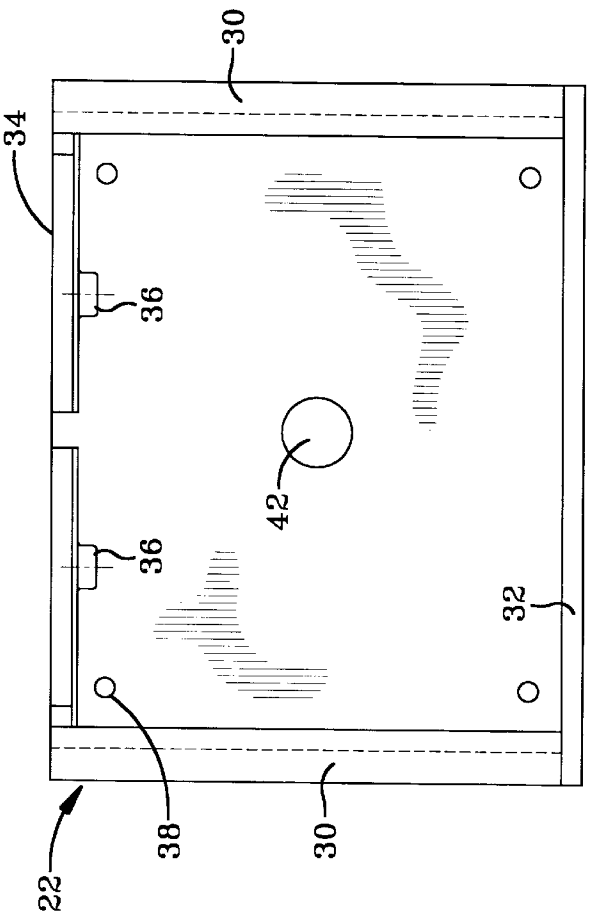
FIG. 7 is a front view of the preferred junction box of FIG. 4.
Figure 5:
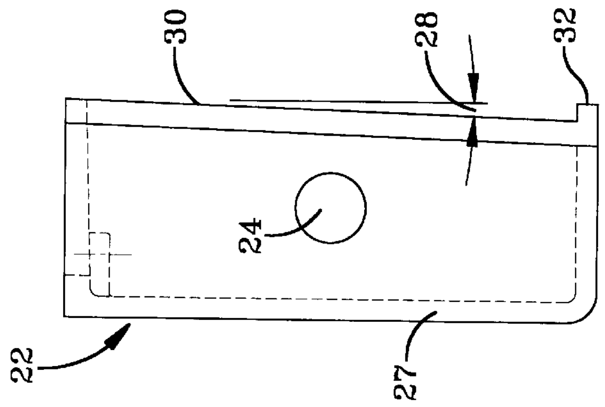
FIG. 5 is a side view of the preferred junction box of FIG. 4.

As shown in FIGS. 5–7, junction box 22 includes a rear wall 27, a bottom wall 29, and two sidewalls 44. The top of junction box 22 is left open. Both sidewalls 44 extend generally perpendicularly from rear wall 27 to separate ridges 30. Each ridge 30 extends generally outwardly and perpendicularly from the end of the respective sidewalls 44. Ridges 30 are slanted at a slight angle with respect to rear wall 27, approximately equivalent to the slope of the sides of fixture housing 2. Ridges 30 extend from the top of the junction box 22 to the bottom of the junction box 22. A ledge 32 is formed at the bottom of each ridge 30 and extends across the bottom of junction box 22 connecting the ridges to one another. Bottom wall 29 extends generally perpendicularly from rear wall 27 to ledge 32. Abutments 36, each having a threaded cavity for receiving a screw, extend from the top edge 34 of rear wall 27. Aperture 42 in rear wall 27 receives power lines from the electrical box or a junction box in the building. As can be appreciated, aperture 42 can be used to receive electrical wires for powering light fixture 1. Plug holes 24 on opposite sides of junction box 22 are provided for powering adjacent light fixtures. It should also be appreciated that aperture 42 can be the wire way for other electrical signal types, such as feedback lines from the light fixture.

Figure 9:
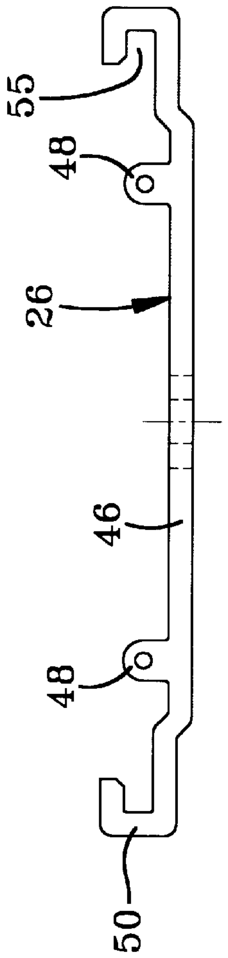
FIG. 9 is a top view of the preferred extrusion plate of FIG. 4.
Figure 10:
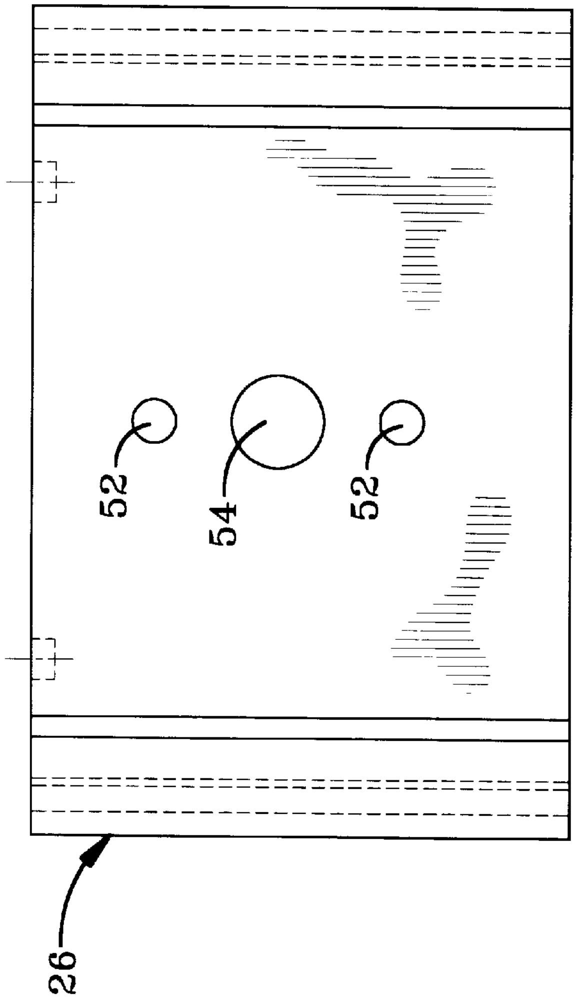
FIG. 10 is a front view of the preferred extrusion plate of FIG. 4.
Figure 8:
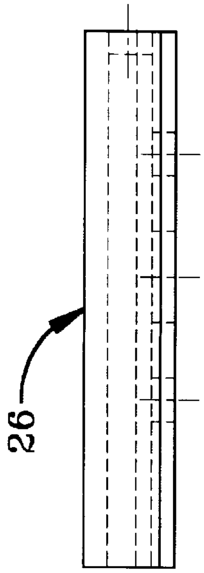
FIG. 8 is a side view of the preferred extrusion plate of FIG. 4.

Referring to FIGS. 8–10, extrusion plate 26 includes a mounting wall 46 having a J or hooked shaped arm portion 50 at each end. Each J or hooked shaped arm portion 50 defines a long inner cavity 55 dimensioned to receive one of the ridges 30 of junction box 22. The top of the extrusion plate 26 has a slight angle equal to angle 28 of junction box 22. A pair of abutments 48 including threaded cavities, similar to abutment 36 of junction box 22, protrudes outwardly from mounting wall 46. A pair of holes 52 is provided for mounting extrusion plate 26 to a sidewall of fixture housing 2. An opening 54 provides a wire way for the electrical connection of the lamp in light fixture 1 to the power from the electrical box in the building.

In assembling the light fixture and necessary electrical wiring, junction box 22 is mounted to the electrical or junction box on the wall of a building, preferably through holes 38 by screws or the like. Electrical power wires are pulled through aperture 42 prior to tightening junction box 22 to the wall or electrical box of the building. Extrusion plate 26 is mounted to a sidewall of fixture housing 2, preferably through mounting holes 52. Electrical connection wires from the light fixture 1 are pulled through opening 54. Once extrusion plate 26 is mounted to fixture housing 2 and junction box 22 is mounted to the electrical or junction box of the building, the user or electrician can complete the electrical connections easily without opening the lighting fixture or the electrical box in the building. J or hooked shaped arms 50 and cavities 55 of extrusion plate 26 are slid over ridges 30, so that each ridge is received in one of the cavities. Extrusion plate 26 slides down the length of junction box 22, until the bottom of extrusion plate 26 makes contact with ledge 32. At this point, the top surfaces of box 22 and plate 26 will be flush with one another, because the angle on the top of plate 26 matches the angle 28 of box 22.

Figure 11:
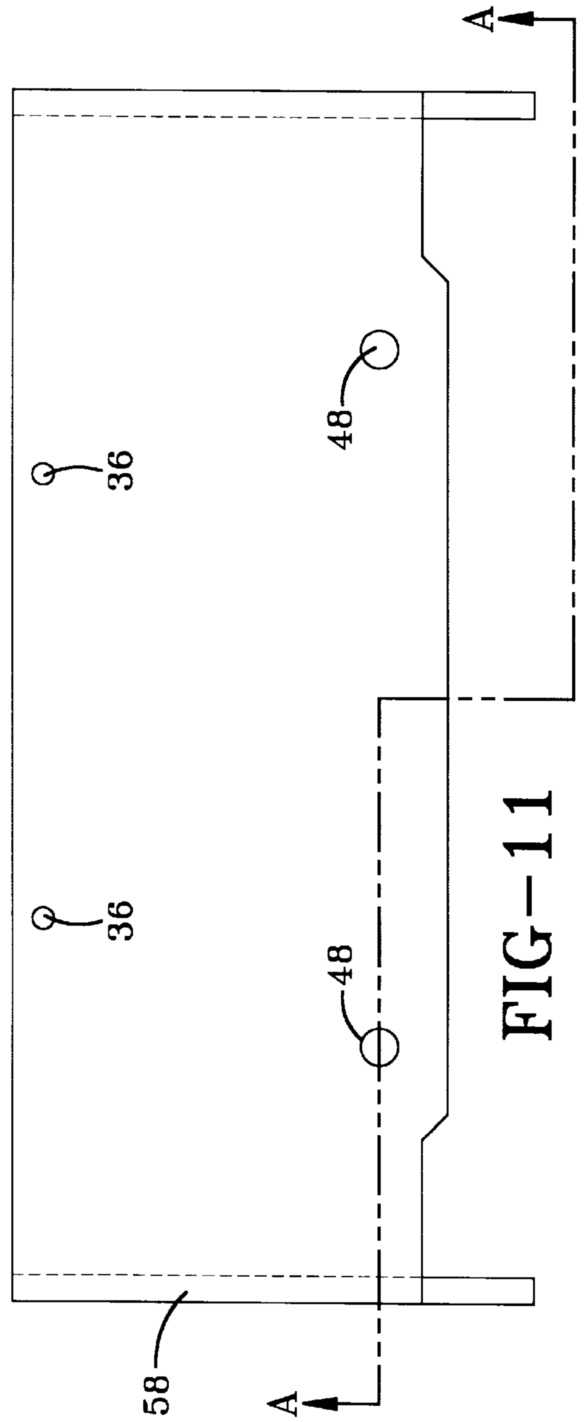
FIG. 11 is a top view of the preferred junction box and extrusion plate forming a unified structure.
Figure 12:
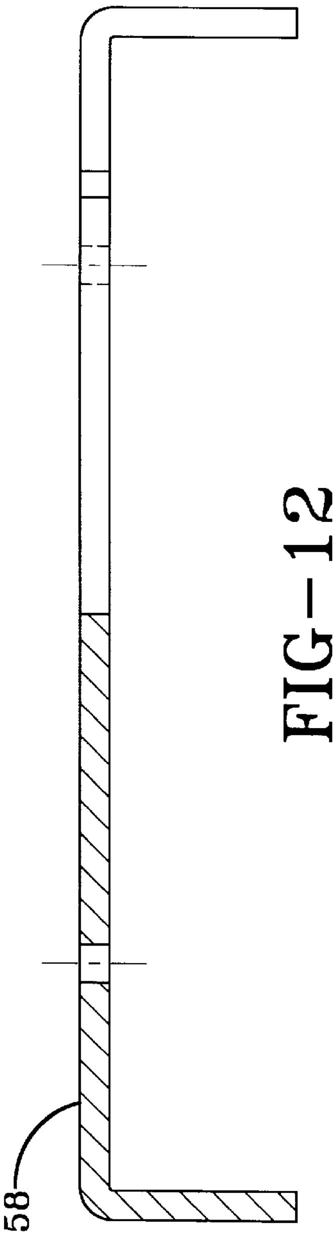
FIG. 12 is a cross sectional view along the lines A—A of a preferred top plate.

The electrician can now easily connect the power lines from the wall and the light fixture and push the wiring connections into junction box 22 and the installation of a top plate 58. As can be seen in FIG. 11, the sliding of the extrusion plate 26 over junction box 22 forms a unified structure. As shown in FIG. 12 top plate 58 is provided that includes two apertures 59 that line up with abutments 36 on junction box 22 and two apertures 60 that line up with abutments 48 on extrusion plate 26. Top plate 58 is placed over the top surfaces of the unified structure and anchored to the structure using conventional screws. Top plate 58 protects the electrical connections from deleterious substances. The electrician can now easily connect the power lines from the wall and the light fixture, push the wired connections into junction box 22 and complete the installation with the mounting of top plate 58.

It should be appreciated that the use of fasteners to connect junction box 22 to extrusion plate 26 is eliminated. This is because the weight of lamp fixture 1, and the matching of ridges 30 with cavities 55 keep the fixture in place. Top plate 58 ensures that extrusion plate 26 and fixture 1 are not jarred off of junction box 22. In a preferred aspect of the invention, side walls 44 could have lowered portions so that heat from the lamp could pass through junction box 22 and out into the air.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar they come within the scope of the invention as claimed or the equivalents thereof.

What is claimed is:

1. An outdoor building lamp fixture support and junction box for mounting a lamp fixture that refracts light in different directions to a building for being wired to an electrical building junction box in the building and for acting as a wiring terminal for the other fixtures by being capable of holding electrical wires from the building junction box for electrically connecting at least one other lamp fixture to the building junction box, the lamp fixture including a housing having at least one sloping side and a glass portion extending from the housing, said lamp fixture support and junction box comprising:

a lamp junction box for being mounted to the building and electrically connected to the building junction box and for holding electrical power wires from the lamp fixture and from the building junction box, said lamp junction box including:

a rear wall mountable to the building;

opposing, parallel sidewalls extending from said first wall;

ridges extending from said side walls and being slightly angled to match the slope of said at least one sloping side wall of the housing;

a bottom wall extending from the lower edge of said rear wall and being transverse to said side walls; and at least one aperture for electrical power wires to pass between said lamp junction box and the building junction box and between said lamp junction box and the at least one other lamp fixture;

said lamp junction box being of sufficient capacity to hold electrical power wires to electrically connect the lamp fixture to the building junction box and to electrically connect at least one other lamp fixture to the building junction box, and being of sufficient strength to hold the lamp fixture in an outdoor environment;

a mounting plate for attachment to the light fixture, said mounting plate including:

a mounting wall for closing the front of said lamp junction box when said lamp fixture is attached to said lamp junction box, said mounting wall having a wall structure defining cavities for receiving by sliding engagement said ridges to attach said light fixture with said mounting plate attached thereto, to said lamp junction box; and an aperture for passing electrical power wires between the lamp fixture and said lamp junction box; and a top plate for covering and enclosing said lamp junction box.

2. The support of claim 1, wherein said mounting plate has a top surface that is slightly angled to compensate for the angle of the ridges, so that the top surface of said mounting plate and a top surface of said junction box portion are flush with one another when said mounting plate engages said junction box portion.

3. The outdoor building lamp fixture support and junction box of claim 1, wherein said mounting plate includes hooked shaped end portions forming said cavities for receiving said ridges.

4. The support of claim 1, wherein said rear wall includes at least one hole for ingress and regress of the electrical power wires from the electrical junction box in the building and at least one hole in one of the sidewalls for ingress and regress of electrical power lines for powering adjacent light fixtures.

5. An outdoor building lamp fixture support and junction box according to claim 1 wherein said lamp junction box is for mounting on a vertical wall of the building, said rear wall of said lamp junction box and said mounting wall of said mounting plate are vertically oriented parallel to the vertical building wall, and said lamp junction box and said mounting plate support said lamp fixture in a horizontal position and perpendicular to the building wall.

6. An outdoor building lamp fixture support and junction box according to claim 1 and further including fastener receptacles in said lamp junction box and in said top plate, and fasteners for entering said receptacles to cover said lamp junction box to prevent deleterious substances from contacting electrical power wires in said lamp junction box.

7. An outdoor building lamp fixture support and junction box according to claim 1 wherein said wall structure defining cavities of said mounting plate comprises J-shaped walls defining said cavities.

8. An outdoor building lamp fixture support and junction box according to claim 1 wherein said ridges extend in opposite directions away from rear walls, and wherein said wall structure defining cavities of said mounting plate comprise J-shaped walls at opposite ends of said mounting plate, said ridges of said lamp junction box being slidable into said cavities.

9. An outdoor building lamp fixture support and junction box according to claim 1 wherein said at least one aperture is at least two plug holes having waterproof plugs for enabling the attachment of a conduit pipe for the illumination of at least two other fixtures.

10. The combination of an outdoor lamp fixture and a lamp junction box, said combination including:

a lamp fixture having a housing and glass walls through for transmitting light, said housing holding electrical wires for connection to electrical power wires; and an outdoor building lamp support for mounting said lamp fixture to a building and for being a waterproof connecting terminal for the electrical wires from said lamp fixture and the wires of the building inside the building, said lamp junction box comprising:

a lamp junction box for being mounted to the building for serving as the wiring terminal for the wires from the building junction box, the wires from the lamp fixture mounted therein and the wires from at least two other fixtures, said lamp junction box including:

a rear wall mountable to the building;

opposing, parallel sidewalls extending from said first wall;

ridges extending from said side walls and being slightly angled to match the slope of said at least one sloping side wall of the housing;

a bottom wall extending from the lower edge of said rear wall and being transverse to said side walls; and at least one aperture for electrical power wires to pass between said lamp junction box and the building junction box and between said lamp junction box and the at least one other lamp fixture;

said lamp junction box being of sufficient strength and capacity to hold electrical power wires to electrically connect the lamp fixture to the building junction box and the wire leads from at least one other lamp fixture to the building junction box, and being of sufficient strength to hold the lamp fixture in an outdoor environment, and to support said lamp fixture in an outdoor environment;

a mounting plate for attachment to the light fixture, said mounting plate including:

a mounting wall for closing the front of said lamp junction box when said lamp fixture is attached to said lamp junction box, said mounting wall having a wall structure defining cavities for receiving by sliding engagement said ridges to attach said light fixture with said mounting plate attached thereto, to said lamp junction box; and an aperture for passing electrical power wires between the lamp fixture and said lamp junction box; and a top plate for covering and enclosing said lamp junction box.

11. The combination of claim 10, wherein said rear wall includes at least one hole for ingress and egress of the electrical power wires from the electrical junction box in the building and at least one hole in one of the sidewalls for ingress and regress of electrical power lines for powering adjacent light fixtures.

* * * * *